United States Patent
Chen et al.

(10) Patent No.: US 12,174,335 B2
(45) Date of Patent: Dec. 24, 2024

(54) ABSOLUTE GRAVIMETER AND MEASUREMENT METHOD BASED ON VACUUM OPTICAL TWEEZERS

(71) Applicants: ZHEJIANG UNIVERSITY, Zhejiang (CN); ZHEJIANG LAB, Zhejiang (CN)

(72) Inventors: Xingfan Chen, Zhejiang (CN); Yishi Liu, Zhejiang (CN); Xiaowen Gao, Zhejiang (CN); Nan Li, Zhejiang (CN); Huizhu Hu, Zhejiang (CN); Cheng Liu, Zhejiang (CN)

(73) Assignees: ZHEJIANG UNIVERSITY, Zhejiang (CN); ZHEJIANG LAB, Zhejiang (CN)

( * ) Notice: Subject to any disclaimer, the term of this patent is extended or adjusted under 35 U.S.C. 154(b) by 103 days.

(21) Appl. No.: 17/927,748

(22) PCT Filed: Aug. 28, 2020

(86) PCT No.: PCT/CN2020/112092
§ 371 (c)(1),
(2) Date: Nov. 25, 2022

(87) PCT Pub. No.: WO2021/248698
PCT Pub. Date: Dec. 16, 2021

(65) Prior Publication Data
US 2023/0243998 A1   Aug. 3, 2023

(30) Foreign Application Priority Data

Jun. 12, 2020   (CN) ......................... 202010534366.2

(51) Int. Cl.
*G01V 7/14* (2006.01)
*G01J 9/02* (2006.01)
*G01V 7/04* (2006.01)

(52) U.S. Cl.
CPC .................. *G01V 7/14* (2013.01); *G01J 9/02* (2013.01); *G01V 7/04* (2013.01)

(58) Field of Classification Search
CPC ................ G01V 7/14; G01V 7/04; G01J 9/02
See application file for complete search history.

(56) References Cited

U.S. PATENT DOCUMENTS

| 6,784,420 B2 * | 8/2004 | Wang ................. G01N 15/1433 |
| | | 250/251 |
| 2009/0108172 A1 * | 4/2009 | Bradley ................. G02B 21/32 |
| | | 359/619 |
| 2016/0178792 A1 | 6/2016 | Kasevich et al. |

FOREIGN PATENT DOCUMENTS

| CN | 102346261 | 2/2012 |
| CN | 104765075 | 7/2015 |
| | (Continued) | |

OTHER PUBLICATIONS

Translation of CN109814165.*
(Continued)

*Primary Examiner* — Helen C Kwok
(74) *Attorney, Agent, or Firm* — JCIPRNET (57) ABSTRACT

An absolute gravimeter and a measurement method based on vacuum optical tweezers. The micro-nano particle releasing device is equipped with micro-nano particles, and is located above laser optical tweezers, and the laser optical tweezers have two capturing beams which pass through the respective convergent lenses and then converge at an intersection. An area where the intersection is located serves as an optical trap capturing region, and the micro-nano particles are stably captured by the two capturing beams in the optical trap capturing region. The optical interferometer is electrically connected to the signal processing device, the optical interferometer measures a displacement of the micro-nano particles in real time at the beginning of a free fall process from (Continued)

the optical trap capturing region and sends the displacement signal to the signal processing device. The signal processing device obtains a measured value of an absolute gravitational acceleration.

8 Claims, 4 Drawing Sheets

(56) References Cited

FOREIGN PATENT DOCUMENTS

| | | |
|---|---|---|
| CN | 108897057 | 11/2018 |
| CN | 109814165 | 5/2019 |
| KR | 20110131975 | 12/2011 |

OTHER PUBLICATIONS

Translation of CN104765075.*
"International Search Report (Form PCT/ISA/210) of PCT/CN2020/112092," mailed on Mar. 1, 2021, with English translation thereof, pp. 1-4.
"Written Opinion of the International Searching Authority (Form PCT/ISA/237) of PCT/CN2020/112092," mailed on Mar. 1, 2021, pp. 1-5.

* cited by examiner

ABSOLUTE GRAVIMETER AND MEASUREMENT METHOD BASED ON VACUUM OPTICAL TWEEZERS

CROSS-REFERENCE TO RELATED APPLICATION

This application is a 371 of international application of PCT application serial no. PCT/CN2020/112092, filed on Aug. 28, 2020, which claims the priority benefit of China application no. 202010534366.2, filed on Jun. 12, 2020. The entirety of each of the above mentioned patent applications is hereby incorporated by reference herein and made a part of this specification.

TECHNICAL FIELD

The disclosure belongs to an absolute gravitational instrument and a measurement method in the technical field of precision measurement, and particularly relates to an instrument and a measurement method for measuring an absolute gravitational acceleration value.

DESCRIPTION OF RELATED ART

Gravimeter is a precise instrument adopted to measure gravitational acceleration (gravity). Gravimeter may be widely used in earth exploration, prospecting, exploration and other application fields, and is of great significance to the development of the national economy. The basic measurement principle of gravimeter is to detect the free fall time t and distance s of the mass block according to Newton's second law, and then calculate or fit the measured value g of the gravitational acceleration according to the free fall equation $g=2s/t^2$. If what is measured is the relative magnitude of gravitational acceleration, the gravimeter is called a relative gravimeter, and if what is measured is the absolute magnitude of gravitational acceleration, the gravimeter is called an absolute gravimeter. Measurement of gravitational acceleration is also often referred to as measurement of gravity.

The free fall process of mass block starts with releasing the mechanical fixing structure to cause an initial velocity of the mass block. Due to air disturbance interference during free fall process, the surface shape of the mass block object adopted will affect the measurement accuracy, which in turn affects the actual accuracy of measurement of gravity.

Existing gravimeters normally adopt the free-fall distance from decimeters to meters as the measurement distance to obtain high measurement accuracy, and adopt the method of data fitting to reduce the influence of the initial velocity of the mass block in free fall. At the same time, through the vacuum system, the disturbance of air to the movement of the object is reduced, thereby comprehensively improving the measurement accuracy of the gravimeter. However, the conventional gravimeter needs to mechanically fix the mass block before the measurement starts, and it is easy to introduce uncontrollable and unpredictable initial velocity during the release process. In the meantime, the mass block needs to be recycled for use. Every time after one measurement process is completed, a reset mechanism is required to reset the mass block, resulting in problems such as low measurement efficiency, large and complex systems, and limited measurement speed. In short, the mechanical contact of conventional gravimeters inherently has some inevitable error defects.

The existing gravity measurement method mainly adopts the method of mechanically releasing the mass block, and the reset of mass block is utilized to realize the repeated measurement of gravity. This measurement method has many shortcomings such as complex reset, large volume, and many factors causing errors. Technological development, especially in the field of optical force and optical trap, is evolved from a new technology of vacuum optical tweezers based on an optical suspension system, and such technology is expected to develop into a new absolute gravity measurement technology, improving the measurement accuracy of absolute gravity and reduce complexity of system while realizing high-precision and fast measurement method of gravity, so as to meet the urgent needs and scientific application needs of gravity angular velocity measurement in the fields of inertial navigation, geodetic survey and mineral census.

SUMMARY

In view of current technical condition of gravity measurement, the known gravimeter is bulky, and the measurement of mass block requires mechanical support and release, which is prone to interference and also requires reset, making continuous measurement difficult. The present disclosure combines quantum theory, micro-nano technology, and optical power technology and other new field technologies to provide an absolute gravimeter and measurement method based on vacuum optical tweezers. The micro-nano ball serves as a falling mass block, and adopts an optical interferometer to form a differential phase measurement method to realize the displacement measurement of the falling micro-nano ball, and the value of absolute gravity may be obtained by fitting.

The technical solution adopted in the present disclosure is as follows:

1. An absolute gravimeter based on vacuum optical tweezers:

The absolute gravimeter is mainly composed of a vacuum system, micro-nano particles, a micro-nano particle releasing device, laser optical tweezers, an optical interferometer, and a signal processing device. The micro-nano particle releasing device and the laser optical tweezers are all placed in the vacuum system; the optical interferometer and the signal processing device are all located outside the vacuum system. The vacuum system is a vacuum chamber, and the top, bottom and lateral sides of the vacuum chamber are designed as transparent windows. A vacuum chamber provides a vacuum environment for the free fall process of micro-nano particles, so as to prevent the air from affecting the measurement process. There is a light-transmitting optical window on the wall of the vacuum chamber, and the optical signal inside and outside the vacuum chamber is transmitted through the optical window.

The micro-nano particle releasing device is equipped with micro-nano particles, and the micro-nano particle is a medium for gravity measurement, which is provided by the micro-nano particle releasing device during each measurement process. The micro-nano particle releasing device is located above the laser optical tweezers, and the laser optical tweezers are mainly composed of two capturing beams which are horizontally coaxial and two convergent lenses. The two capturing beams pass through the respective convergent lenses and then converge at the intersection. The area where the intersection is located serves as the optical trap capturing region, and the micro-nano particles are stably captured by the two capturing beams in the optical trap capturing region. The capturing beam is a laser, and the laser is converged in the vacuum chamber through the converging lens to form a vacuum optical tweezers, which is adopted as the optical trap capturing region for micro-nano particles. The micro-nano particle releasing device and the vacuum optical tweezers capturing region formed by the laser are all located in the vacuum chamber and distributed from top to bottom along the direction of gravity.

The optical interferometer is electrically connected to the signal processing device. The optical interferometer measures the displacement of the micro-nano particles in real time at the beginning of the free fall process from the optical trap capturing region and sends the displacement signal to the signal processing device. The signal processing device obtains the measured value of the absolute gravitational acceleration through method processing according to the real-time displacement of the micro-nano particles.

The material of the micro-nano balls is silicon dioxide, of which the diameter is 1 micron to 30 microns in diameter, and the optimal diameter is about 10 microns. In specific implementation, the micro-nano balls may be commercial micro-nano balls.

The micro-nano balls are located in the micro-nano particle releasing device, and are released and dropped from the micro-nano particle releasing device during the releasing process. The releasing method of the micro-nano particle releasing device adopts the releasing method of piezoelectric ceramic resonance vibration.

The optical interferometer includes a laser, emitting mirrors M1 and M2, three polarizing beam splitting prisms PBS1 to PBS3, glass plates P1 and P2, and a polarizer Q1. An upper polarizing beam splitting prism PBS1 and an upper glass plate P1 are provided right above the gravity drop of the micro-nano balls. The upper emitting mirror M2 is arranged on the lateral side of the upper polarizing beam splitting prism PBS1, and the lower polarizing beam splitting prism PBS2 and a lower glass plate P2 are arranged directly under the gravity drop of the micro-nano balls. The lower emitting mirror M1 is set directly under the lower polarizing beam splitter prism PBS2, and the receiving polarizing beam splitter prism PBS3 and the polarizer Q1 are arranged on the lateral side of the lower emitting mirror M1. The laser emits two linearly polarized beams with different frequencies. The first linearly polarized beam is transmitted through the upper polarizing beam splitter prism PBS1 and the upper glass plate P1 in turn from right above the micro-nano balls along the positive direction of the gravity direction, and then irradiated on the micro-nano balls. After being scattered by the surface of the micro-nano balls, an upper scattered light is generated, and the upper scattered light returns upward along the optical path, is transmitted by the upper glass plate P1, reflected by the upper polarizing beam splitter prism PBS1, and then incident on the upper emitting mirror M2, and incident on the receiving polarizing beam splitter prism PBS3 after being reflected by the upper emitting mirror M2, and is reflected again, thus forming a first probe optical path. The second linearly polarized beam is reflected by the lower polarizing beam splitter prism PBS2 in turn from the bottom of the micro-nano balls in the opposite direction of the direction of gravity, and transmitted through the lower glass plate P2, and then irradiated to the micro-nano balls. After being scattered by the surface of the micro-nano balls, the lower scattered light is generated, and the lower scattered light is returned downward along the optical path, transmitted by the lower glass plate P2, reflected by the lower polarizing beam splitter prism PBS2, and then incident on the lower emitting mirror M1, and then incident on the receiving polarizing beam splitter prism PBS3 after being reflected by the lower emitting mirror M1, and is transmitted again, thus forming a second probe optical path. The beams reflected and transmitted by the receiving polarizing beam splitter PBS3 are converged and interfered, and then incident on the photoelectric conversion circuit through the polarizer Q1 to be collected and detected to obtain the interference signal. The photoelectric conversion circuit is connected to the circuit information processing system, and the circuit information processing system analyzes and processes the optical signal to obtain a measurement result of the optical phase.

In this way, the laser emits two linearly polarized beams with different frequencies. The two linearly polarized beams are irradiated to the micro-nano balls in the positive and negative directions of the gravity direction respectively through the beam splitting optical path. Then the two linearly polarized beams are scattered after passing through the micro-nano balls, and scattered light is generated. The scattered light corresponding to the two linearly polarized beams passes through the optical signal collection optical path and then converges and interferes to be received.

The light source adopted in the laser of the optical interferometer is a high-stability light source, and the wavelength stability requirements of the light source are set according to the design requirements of the absolute gravimeter. The relative stability of the light source is not worse than the relative stability index of absolute gravity measurement. Under the gravity measurement stability index of 1 ng ($10^{-9}$×gravitational acceleration), the relative stability of gravity is $10^{-9}$, and the corresponding wavelength stability requirement is better than 0.001 ppm.

2. An absolute gravity measurement method of an absolute gravimeter, the steps of the method are as follows:
   a) The laser of the vacuum optical tweezers is turned on to output two horizontal capturing beams, and an optical trap capturing region is formed in the vacuum chamber through the respective converging lenses;
   b) A micro-nano ball is released through the micro-nano ball releasing device, and then the micro-nano ball moves downward under the action of gravity to free fall to the optical trap capturing region, and is stably captured in the center of the optical trap capturing region;
   c) The optical interferometer is turned on, and the interferometric measurement of the displacement of the micro-nano balls begins;
   The capturing beam of the laser of the vacuum optical tweezers is turned off, and the micro-nano balls are released from the center of the optical trap capturing region under the action of gravity and free fall downward along the direction of gravity;
   When the capturing beam is turned off, the real-time change process of the displacement of the micro-nano balls is measured by the optical interferometer, and the measurement time series s of the displacement over time is obtained;
   d) Fitting is performed according to the measurement time series s to obtain a measurement value of absolute gravity;
   e) The optical interferometer is turned off and this measurement is ended;
   f) The above a)~e) steps are repeated to achieve continuous measurement of absolute gravity.

The method for measuring the displacement signal s(n) of the micro-nano ball during free fall is specifically as follows: the interference signal is collected and detected by an optical interferometer, and the measurement light is irradiated on the micro-nano ball. In the falling process of the micro-nano ball, the optical phase of the scattered light in the opposite direction of gravity changes, the amplitude of the scattered light is the same, and the phase is opposite. The optical phase change of the scattered light in the opposite direction of gravity is recorded as dφ/2, and the optical phase change of the scattered light in the direction of gravity is denoted as −dφ/2. The optical interferometer collects and uses the light along the positive and negative directions of gravity for interference. According to the analysis of the interference signal, the current phase clip is measured in real time and output at regular intervals, a measurement value of the optical phase change is obtained for each acquisition, and the sampling interval is T. Sampling is performed continuously to obtain n real-time measurement value series dφ(n) of optical phase change. According to the following equation, the displacement signal s(n) of the n-th measurement of the micro-nano ball is obtained, and then the measurement time series s of the displacement over time is obtained:

$$s(n)=d\varphi(n)\times\lambda/8\pi$$

In the equation, $\lambda$ is the light wavelength adopted by the optical interferometer, n is the serial number of the measurement sampling, which is taken as a natural number, and each sampling time is T, and the atomic clock provides a unified timing signal and a time reference.

In this way, the optical interferometer of the present disclosure adopts the reflected light of the micro-nano balls along the gravitational direction to the incident light output by the interferometer to form differential interference, thereby reducing various common mode noises and improving the measurement stability of the falling displacement of the micro-nano balls, which indirectly improves the stability of absolute gravity measurement.

The fitting according to the measurement time series s is performed by adopting the least squares method, and the measurement value g of absolute gravity is obtained by fitting the input measurement time series s according to the following equation:

$$s(n)=s(0)+g\times(nT)^2/2$$

In the equation, s(n) represents the displacement signal of the n-th measurement of micro-nano balls, s(0) is a constant coefficient, which is also obtained by fitting through the least squares according to the above equation, and n represents the total number of measurement value in the measurement time series, that is, the total number of measurements, T is the sampling time, and the atomic clock provides a unified timing signal and a time reference. Specifically, n and T are known parameters, T is the sampling period signal generated by the time reference provided by the atomic clock of the system, s(0) and g are fitting parameters, and the fitting result of g corresponds to the absolute gravity value to be measured.

In the absolute gravimeter of the present disclosure, the atomic clock provides a unified timing signal, thereby obtaining accurate timing information and time series information. Typically, a rubidium atomic clock may be adopted, and the time stability requirement thereof is 3 times or higher than the measurement stability of the gravity target. Under the gravity measurement stability index of 1 ng ($10^{-9}\times$gravitational acceleration), the relative stability of gravity is $10^{-9}$, and the time reference stability requirement corresponding to the atomic clock time is better than $10^{-10}$.

The measurement time T has a time reference, which is also related to the measurement stability of absolute gravity. Generally speaking, the stability of active crystal oscillators and passive crystal oscillators is within 1 ppm (percent per million: $10^{-6}$), which basically is unable to meet the time reference requirement. In the present disclosure, it is required to use the atomic clock as the time reference of the system to provide the time reference for the working sequence and time period of the system. Typically, a rubidium clock is adopted, and the stability thereof is 1 ppb (percent per billion: $10^{-9}$) or more. In the meantime, other commercial atomic clocks with higher stability may be selected according to the requirements of absolute gravimeters. Generally speaking, the accuracy requirement of the atomic clock is higher than the target precision stability requirement of the absolute gravimeter, and such requirement has no technical difficulty in the current state of commercial atomic clock technology.

The optical interferometer of the present disclosure measures the displacement and time signal of the micro-nano ball in the free fall process in real time, and is combined with the highly stable optical interferometer to measure the wavelength and the high stability time reference signal provided by the atomic clock through the variation relationship between the displacement and time, thereby realizing the measurement of absolute gravity through free fall.

The disclosure adopts micro-nano balls as measurement carriers, and combines vacuum optical tweezers technology, eliminates ambient air interference, thus realizing absolute gravitational acceleration measurement, and improving measurement of speed and efficiency.

The gravimeter of the disclosure adopts micro-nano balls as measurement carriers, and combines vacuum optical tweezers technology, realizes capture initialization and free fall control after the ball is released, utilizes an interferometer to accurately measure the real-time position of balls after the ball is released, and combines the time reference and the reference value of the wavelength of the light source for calculation to obtain the absolute gravitational acceleration.

The advantageous effects of the present disclosure are:
For the first time, the disclosure provides an absolute gravimeter scheme based on vacuum optical tweezers. Micro-nano balls are adopted as mass blocks for gravity measurement. Laser capture technology is utilized to eliminate the influence of mechanical release on the initial velocity of the measurement mass blocks. The interference of air on the free-falling motion of the micro-nano balls is reduced through the vacuum system, and laser interferometry measurement technology is utilized to measure real-time measurement of displacement of falling micro-nano balls. Combined with the wavelength reference length of the interferometer light source and the time reference provided by the atomic clock, the measurement of absolute gravity is realized. In the meantime, the process of reloading and resetting the mass block before and after the measurement may be avoided through the continuous release of the micro-nano balls, so the characteristics of high-speed measurement may be established.

The disclosure adopts the optical support of the optical trap to replace the existing mechanical support. By using the capturing beam to control the influence of release callused by replacement contact mechanical, and by using the vacuum system to eliminate the interference of the thermal motion caused by air molecules on the measurement of micro-nano balls, thereby realizing high precision and fast measurement of gravity.

The solution provided in the present disclosure makes full use of the high-precision characteristics of the optical suspension system in the vacuum optical tweezers, and is expected to become a miniaturized, high-precision, wide-bandwidth gravity measuring instrument, provides a new technical approach for absolute gravity measurement, and is expected to facilitate the development of the field of gravimetric measurement technology, and promotes the popularization and application of gravimeters in the fields of prospecting and geological census.

DESCRIPTION OF THE EMBODIMENTS

The present disclosure will be further described below in conjunction with accompanying drawing and embodiment.

In specific implementation, the basic principle of the gravimeter is relatively simple. The current core difficulty and key technology lie in the control of several main error sources. The influence of the environment on the measurement cannot be ignored in practical applications. The main results of the core error and solution include:

The first technical issue is the influence of air resistance. Due to the existence of air molecules in the system, the mass block is affected by the Brownian motion of airflow and air molecules during the descending process of mass block. The mass block is not only subjected to gravitational acceleration in actual practice, but also to the reaction force of the collision of air molecules.

The above problem may be solved through a vacuum system, which removes the air from the environment during the free fall process of the mass block, so that this error source may be significantly reduced. In the present disclosure, a vacuum environment is provided for micro-nano particles, and the adopted vacuum system may utilize the typical optical vacuum chamber technology, which is a mature technology and has successful application examples in many optical measurement fields. In the present disclosure, a vacuum chamber will be adopted to provide a free fall space for the micro-nano balls. The optical signals related to the micro-nano balls are transmitted inside and outside the optical window of the vacuum chamber.

The second technical problem is the environmental interference caused to the mass block. For a conventional gravimeter, when measuring a mass block (pyramid corners are adopted typically), a mechanical structure is used for fixing, and a mechanical structure releasing method is utilized at the beginning of measurement. In this method, due to the environment of mechanical contact, the initial velocity of the mass block is actually non-zero during the release process, and the velocity direction is random and uncontrollable, which is difficult to model and eliminate and is the main source of error.

In the present disclosure, the mass block is supported by optical power (in the present disclosure, micro-nano balls are adopted as the mass block). According to the relevant theory of quantum optics, a photon has momentum. If a photon is irradiated on an object, a pressure is generated on the object, which is called light pressure. This force is related to the magnitude of light intensity, power density and an irradiation area. Certainly, this force is also quite small. With the development of laser technology, a light field with high power and power density may be realized, so that a large light pressure may be generated. It may be calculated that, for a small ball with a diameter of 100 nm~10 um, the pressure generated by the laser of the order of mW may be adopted to realize a force equivalent to gravity. In this way, an optical trap may be formed by using a capturing beam. The gradient force of the optical trap or the light force of the scattering force is utilized to suspend the ball (that is, to capture the ball). In this capturing process, there is no mechanical contact with the ball, the ball may be captured and released through switch of the AOM or EOM laser, thereby eliminating the uncontrollable initial velocity of the ball caused by mechanical contact.

The micro-nano ball will collide with air molecules in the air to exchange momentum, which will cause the micro-nano ball itself to perform Brownian motion. This motion is sometimes called thermal motion. This motion will also affect the position and initial value of velocity of the ball to a certain extent. Under the existing technology, the molecular density may be reduced to reduce the thermal motion through the vacuum system. The thermal motion of the ball caused by the residual molecules in the vacuum system may be cooled by the vacuum ball cooling system. By adding a cooling light and motion measurement system in addition to the capturing light, and by monitoring the position and motion measurement of the micro-nano ball at all times, control is performed by using a cooling beam to cancel the impulse of air molecules and reduce the position fluctuation and velocity of the ball, so as to achieve laser cooling of the micro-nano ball and improve the initial position accuracy of the ball. In the present disclosure, cooling after the capturing the micro-nano ball is optional and may improve performance, but is not an essential component of the present disclosure.

The third problem is the accurate and stable real-time measurement of the displacement of the falling mass block.

The core of gravity measurement is the displacement measurement of the falling mass block. In the present disclosure, the differential interference method is utilized to realize the displacement measurement of the falling micro-nano particles. The scattered light of micro-nano particles along the positive and negative directions of gravity is adopted to form a differential interferometer, so as to realize differential measurement of the phase and suppress various common mode errors, thus obtaining a stable measurement of the displacement and providing a basis for the stability of the absolute gravimeter subsequently.

In the differential optical interferometer of the present disclosure, the two interfering beams and the falling velocity of the ball are opposite in directions, respectively carrying the light phase corresponding to the movement displacement of the ball, with the same size and opposite amplitudes, which exactly constitutes a differential pair, so that various common mode errors and the like may be eliminated. For every ¼ wavelength of the downward movement of the micro-nano ball, the light incident and reflected from the upper surface increases the $\pi$ light phase, the light incident and reflected from the lower surface decreases the $\pi$ phase, and the phase difference clip between the scattered light from the upper and lower surfaces is shifted by $2\pi$ phase. In the actual interferometer, the measurement of the interference phase difference clip of the scattered light from the upper and lower surfaces is realized, and the variation of the displacement is obtained according to calculation.

In this conversion process, the wavelength measured by the interferometer provides a conversion reference and a conversion scale factor between the phase and the displacement. In the absolute gravimeter, the magnitude of scale factor is related to the scale of the absolute gravity. In the absolute gravimeter, the wavelength is required to have sufficient stability.

Most of the optical light sources commonly used in current optical trap systems include a 1064 nm optical trap capturing light source and a 532 nm cooling light source. The wavelength stability of typical laser light sources is in the order of $10^{-7}$, which satisfies the requirement of general applications. By using an iodine-stabilized laser as the measurement light source of the interferometer, the relative stability of the wavelength may be improved to $10^{-9}$ or more, which can meet the measurement requirements of a high-precision absolute gravimeter and support ng-level gravity measurement. These lasers are all commercial devices, which may be purchased according to the target accuracy in the design of the gravimeter.

Figure 1:
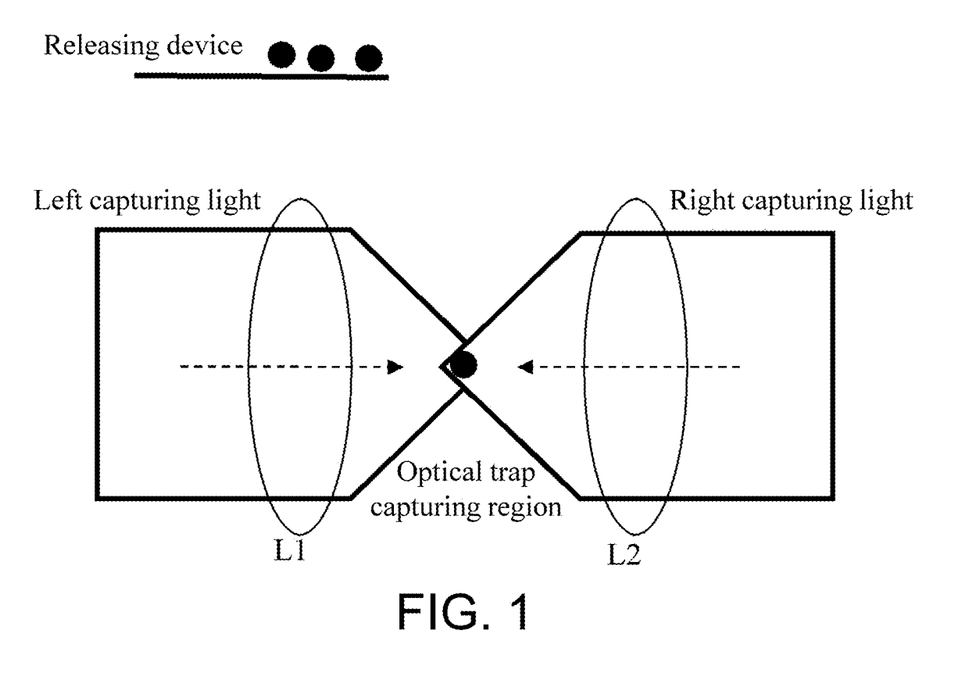
FIG. 1 is a schematic view of capturing an optical trap.

The specific implementation of the capturing optical trap is shown in FIG. 1, which is a schematic diagram of a double-beam optical trap. The function of the capturing optical trap is mainly to capture the particles released by the micro-nano particles from the releasing device, thereby realizing the state initialization of particles in the process of gravity measurement. When the capturing light is turned on, a capturing optical trap is formed. After capturing is performed, by turning off the capturing light, the particles will free fall, that is, the state initialization of micro-nano particles and release of particles are realized by switching the capturing light on and off. In the laser capturing device, the two capturing beams are originated from the same laser. Typically, two polarized lights of a 1064 nm laser serve as the left and right capturing beams, respectively.

As shown in FIG. 1, two lenses L1 and L2 respectively converge the two flat beams incident on the left and right at the focal position in the center, forming an optical trap capturing region near the focal point. The focal point is the center of the optical trap. The optical trap capturing region at the focal point has a capturing effect on the micro-nano balls passing therethrough, and captures the balls in the center without the action of other external forces; the optical trap capturing region is sometimes called the capturing region. As shown in FIG. 1, a micro-nano ball is captured at the capturing region of the optical trap.

The upper left corner of the diagram is a schematic diagram of the releasing device of the micro-nano ball. During each releasing process, a micro-nano ball is provided by the vibration of the piezoelectric crystal PZT, the micro-nano ball moves downward and is captured by the capturing region below. The size of the micro-nano ball and the device size in the figure are schematic diagrams and are not strictly proportional to the actual size.

When the micro-nano ball leaves the center of the optical trap, the laser capturing optical trap has scattering force and gradient force on the captured micro-nano ball, and the scattering force and gradient force point to the center of the optical trap, so that when the micro-nano ball deviates from the center of the optical trap, the optical trap capturing region generates optical force, which pulls the micro-nano ball back to the center of the optical trap. The scattering force is the force that is generated when the micro-nano ball deviates from the center in the horizontal direction (laser incident direction), and the gradient force is the force that is generated when the micro-nano ball deviates from the center in the vertical direction. Scattering and gradient forces act like springs in physics.

In the case of a gravitational field, since the micro-nano ball is also affected by the gravitational force of the earth, the micro-nano ball actually deviates from the center downward, thereby generating an upward gradient force to cancel the gravity of the micro-nano ball. Therefore, after being captured by the optical trap capturing region, the micro-nano ball rests at the center of the optical trap under the action of optical force (scattering force and gradient force) and gravity, and the center of the optical trap serves as the starting position for free falling.

In specific implementation, due to the scattering force of the symmetrical parallel light on both sides of the center of the optical trap and the unequal effect of the gravitational field and the gradient force, the micro-nano ball is substantially located directly above or directly below the center of the optical trap, and will not be located on both sides of the center of the optical trap, and which might result in a height difference. However, in the present disclosure, the capturing region of the optical trap performs capturing through light, so that the particles released by the releasing device are stabilized at the equilibrium position of the optical trap capturing region under the action of optical force. Accordingly, the uncertainty of the initial state of the particles caused by the releasing process is reduced, thereby ensuring that the micro-nano particles released and captured at different times have the same initial state in the subsequent free fall process, and typically the initial velocity is zero (position and velocity fluctuations caused by thermal noise are ignored).

Figure 2:
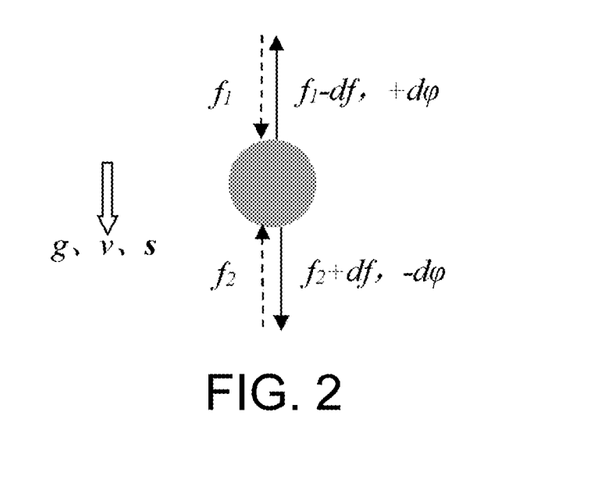
FIG. 2 is a schematic view of a principle for measurement of the position of micro-nano balls.

The principle of measuring the position of the micro-nano ball is shown in FIG. 2. In the figure, the gray ball is the measurement medium. The dashed lines are the upper and lower incident beams irradiating the ball along the positive and negative gravitational directions. The solid line indicates part of the scattered light on the surface of the ball (ignoring scattered light in other directions). The ball is in free fall motion under the action of the gravitational field g.

The upper and lower incident beams are reflected on the surface of the ball, and the solid line respectively indicates the scattered light of the ball along the positive and negative directions of gravity, which are also the two beams interfered by the subsequent optical interferometer.

In the figure, the direction of gravity g and the direction of ball velocity v are downwards as shown by the black arrow, and $f_1$ and $f_2$ are the frequencies of the probe light (shown by the dashed arrow) irradiating the ball from the positive and negative directions of gravity, and the probe light may be provided by dual-frequency laser or single-frequency laser combined with AOM. The probe light generates the scattered light on the surface of the falling ball (the scattered light along the positive and negative directions of gravity respectively as indicated by solid arrows). There is a frequency change df or a phase change dφ related to the velocity v or displacement s of the ball between the scattered light and the incident light, and the scattered light along the positive and negative directions of gravity has the same frequency change value and phase change value in opposite directions. Through the real-time measurement of the frequency difference df or the phase change dφ, the real-time velocity and displacement of the ball may be obtained by inversion calculation, combined with the time information provided by the atomic clock, the magnitude of the absolute gravitational field may be obtained by indirect calculation. The phase change may be measured by means of an optical interferometer, which is a mature technology. In general, optical phase measurement sensitivities better than 1 mrad may be achieved by interferometers.

For a particle, it is assumed that the incident light on the upper and lower surfaces is split by an interferometer light source (such as a highly stable iodine-stabilized frequency laser light source) and irradiated to the upper and lower directions of the ball respectively through the optical path. The adopted incident light, that is, the probe light, has a wavelength of 532 nm. Under the circumstances, $f_1=f_2$. When the ball is stationary, the velocity of the ball is zero, and the displacement of the ball is zero. Under the circumstances, the frequency difference and phase change are both zero, that is, df=0, d=0. If the ball moves downward by ¼ wavelength, that is, 133 nm, the phase change of the upward scattered light is $+\pi$ phase, and the phase change of the downward scattered light is $-\pi$ phase. Under the circumstances, the total phase difference between the upper and lower scattered light is $2\pi$; the light phase measured by the interferometer composed of the upper and lower scattered light is $2\pi$. Under the circumstances, the information of the ball displacement is converted into the phase information of the optical interferometer. According to the measured phase, the displacement information of the ball may be obtained through inversion calculation. The relationship between phase and displacement information is as follows:

$$s=d\varphi/2\pi\times\lambda/4$$

In the equation, $\lambda$ is a wavelength of light used by the optical interferometer.

If the phase measurement accuracy of 1 mrad is achieved, the corresponding displacement accuracy is about 20 pm.

In consideration that, after digitization, the interferometer may measure the optical phase on a regular basis according to the timing reference signal provided by the atomic clock, under the circumstances, the phase measurement obtains the discretization result of the phase, and the sampling period is T. Under the circumstances, the relationship between the phase and the displacement is:

$$s(n)=d\varphi(n)/2\pi\times\lambda/4 \quad (1)$$

In the equation, n represents the serial number of the sampling point.

According to the free fall equation, the displacement of the falling ball under gravity may be expressed as follows:

$$s=s0+g\times t^2/2 \quad (2)$$

In the equation, t is the time, s0 is the starting position of the fall, and g is the gravitational acceleration of the measurement point, which is the physical quantity of the target measurement. According to this equation, if the real-time displacement s and the time t are known, it may be calculated to obtain the magnitude of the absolute gravitational acceleration g. Generally speaking, a fitting method is adopted in this process to improve the signal-to-noise ratio. The typical fitting method is the least square method to obtain the smallest mean square error.

Considering the discretization of the measurement process, the measurement time may be replaced with the sampling period and the serial number. Under the circumstances, the discretized free fall equation is as follows:

$$s(n)=s0+g\times(nT)^2/2 \quad (3)$$

Combined with equation (1), the following may be obtained:

$$d\varphi(n)=8\pi/\lambda\times s0+4\pi/\lambda\times g\times T^2 n^2 \quad (4)$$

In the equation, n is the serial number, T is the adoption period, which is provided by the atomic clock, $\lambda$ is the wavelength, which are all known values, $d\varphi(n)$ is the actual measurement, which is a quadratic function of the serial number n, and g and s0 are the position parameters. According to the multiple measurement results of $d\varphi(n)$, the fitting values of the two parameters g and s0 are obtained by fitting according to the above equation. The fitting value of g corresponds to the measured value of the absolute gravitational acceleration, thereby realizing the measurement of absolute gravity.

Also according to the above equation, the requirements for the timely error and wavelength error may also be obtained. To make the measurement stability and accuracy of the final g meet the target requirements, both T and $\lambda$ need to satisfy certain limitation.

For example, if the measurement stability of g reaches 1 ng, that is, 1 ppb (percent per billion: $10^{-9}$), the time stability and wavelength stability also need to achieve similar accuracy. According to the existing typical technical means, the requirement regarding time stability may be satisfied by adopting a rubidium atomic clock, or other commercial atomic clocks with better performance may be adopted to provide the time reference. In terms of the wavelength, an iodine-stabilized frequency laser may be adopted, there are also other commercial products that meet this requirement. This requirement is not a technical limitation of the present disclosure, and can be solved by selecting appropriate devices.

Figure 3:
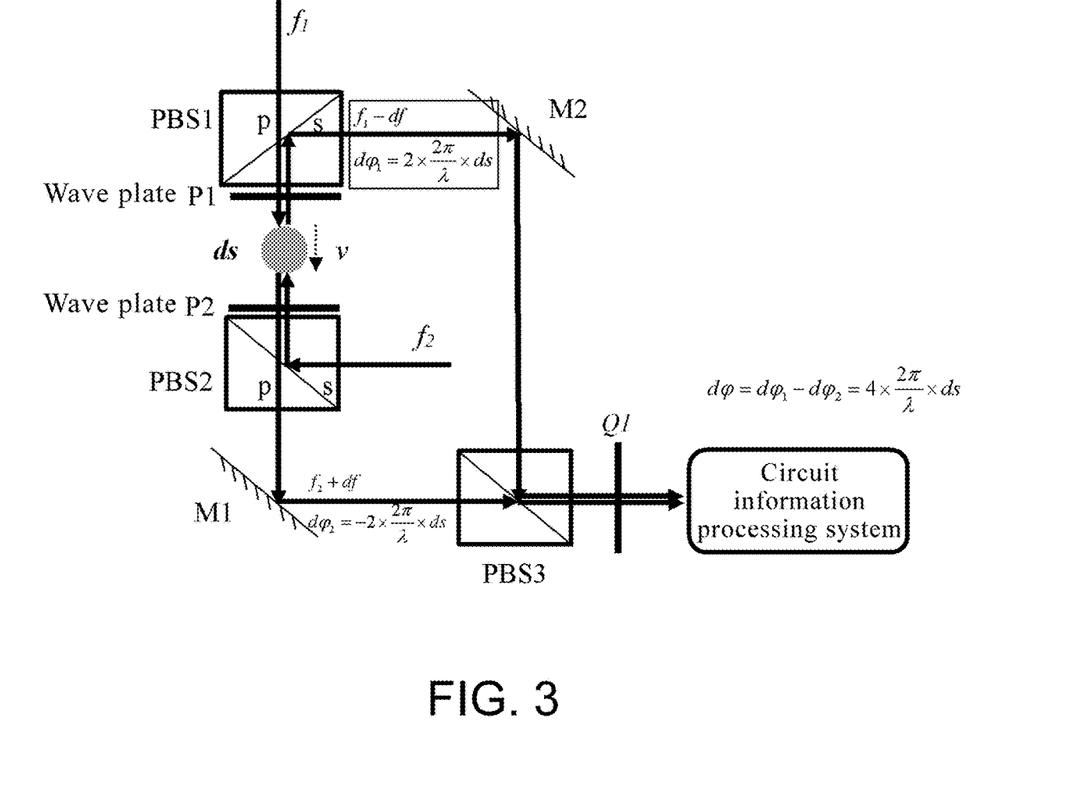
FIG. 3 is a schematic view of a measurement optical path of a free-fall displacement interferometer for balls.

The measurement optical path of the ball free-fall displacement interferometer is shown in FIG. 3. As shown in FIG. 3, $f_1$ and $f_2$ are two linearly polarized beams drawn from the same laser, which are irradiated to the micro-nano ball in the positive and negative directions of the direction of gravity respectively through the light-splitting optical path. The two linearly polarized beams are partially scattered after passing through the micro-nano ball, and the scattered light interferes after passing through the optical signal collection optical path. The interference signal contains the information of the position change ds of the ball.

Three polarizing beam splitting prisms, namely PBS1, PBS2, and PBS3, are included, which mainly realize the polarizing beam splitting and light combining of the system. Two emitting mirrors M1 and M2 are included, which are mainly adopted for light direction adjustment, and two glass plates P1 and P2 are included, which are mainly adopted for polarization state adjustment. A polarizer Q1 is included, which is mainly adopted to realize the direct polarization state adjustment of different polarized lights, so as to realize optical interference, and the optical path is a typical optical interferometer configuration. The interference signal finally passes through the photoelectric conversion circuit, and is provided to the circuit signal processing system of the interferometer to complete the measurement of the optical phase.

The figure shows the situation when the free-fall displacement of the micro-nano ball passes ds and the velocity reaches v in the case of $f_1=f_2$. Under the circumstances, the phase change of the interference signal and the frequency of the interference fringe are $\Delta f$ and $d\varphi$, respectively. The circuit system is adopted to collect photoelectric interference signal information in real time, demodulation is performed to obtain $\Delta f$ and $d\varphi$, and ds may be obtained through calculation in combination with the wavelength value of the light source.

Through the above optical paths, the scattered light from the upper and lower directions of the ball following the polarizer Q1 finally produces differential interference, and the ball motion signal is reflected in the phase difference change of the interference.

In the actual gravimeter, part of the optical path is in the vacuum chamber provided by the vacuum system, including PBS1 and PBS2, glass plates P1 and P2, micro-nano ball and the releasing device thereof, and other optical devices are outside the vacuum chamber. The optical path connection between the optical devices inside and outside the vacuum chamber is an optical transmission window, which is reserved during the processing of the vacuum chamber.

Figure 4:
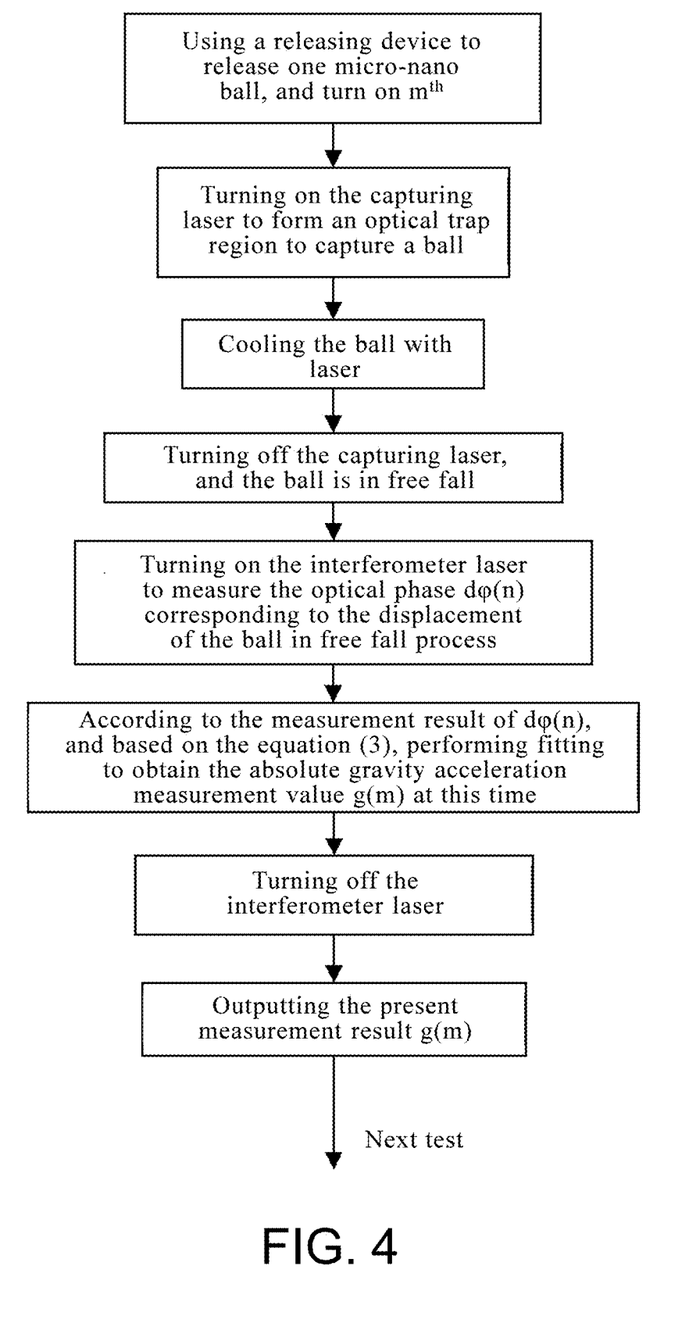
FIG. 4 is an optical gravity test process of an absolute gravimeter.

As shown in FIG. 4, the optical gravity test process of the absolute gravimeter is as follows:

An absolute gravitational acceleration measurement is realized for each micro-nano ball released by the releasing device. For example, for the $m^{th}$ test (m is the sequence of tests, a natural number starting from 1), the gravitational acceleration value g(m) is obtained through the following method, and m represents the sequence of tests.

a) After the micro-nano ball is released by the releasing device, the micro-nano ball falls along the gravity direction under the action of gravity and reaches the optical trap capturing region of the laser cooling chamber;

b) The laser turns on the capturing light, and the optical trap capturing region formed by the capturing light is utilized to capture the micro-nano ball near the center of the optical trap through the optical force effect of the gradient force and the scattering force in the capturing region of the optical trap;

c) The cooling light is turned on as needed, and the cooling light is adopted to perform laser closed-loop feedback cooling on the micro-nano ball to reduce the thermal motion of the ball until the pre-set cooling target is met. This step is optional in the present disclosure. Cooling may not be performed. The residual air may be utilized to dissipate the movement speed of the ball in three directions, and finally the ball randomly and thermally moves around the optical trap.

d) After the thermal motion of the micro-nano ball is reduced and reaches the preset target, the capturing light and cooling light (if any) are turned off simultaneously. Under the circumstances, the capturing optical trap for the micro-nano ball disappears, and the ball moves along the direction of gravity under the action of gravity and perform free fall downward.

e) The measurement interferometer laser is turned on, and periodically measures the interferometric phase difference between the upper and lower directions of light of the ball during the free fall process of the ball under the control of the timing signal provided by the atomic clock. The sampling period is denoted as T, provided by the atomic clock, and the phase sampling value of the $n^{th}$ sampling period is denoted as dφ(n). Sampling is performed continuously for N times, and measurement values of $N^{th}$ optical phases are obtained.

f) According to the N measured values of dφ(n), data fitting is performed according to the following equation, and the least squares method is adopted to obtain the magnitude of the current absolute gravitational acceleration parameter, which is the result of this measurement and denoted as g(m).

$$d\varphi(n)=8\pi/\lambda \times s0+4\pi/\lambda \times g \times T^2 n^2$$

In the above equation, λ and T are constants, which are provided by the wavelength of the light source and the atomic clock, respectively, n is the sampling number, g and s0 are the objects to be fitted, and the fitting value g(m) of the parameter g is the amount of target measurement.

g) The interferometer laser is turned off and the phase measurement is stopped.

h) According to the system setting requirements, the current measurement value is output to the outside, thus ending this measurement of absolute gravity.

Under the control of the system timing signal, the measurement steps in a)~h) as described above are repeated to achieve continuous measurement of absolute gravity.

In the meantime, in order to reduce the influence of time technical error on accuracy of g(m), atomic clocks need to be adopted for timing reference and system timing signals. Typically, an atomic clock with stability better than $10^{-10}$ is adopted as timing reference, which may control the time error within $10^{-10}$, and typical products of this kind include commercial rubidium clocks.

In the optical gravimeter, in order to eliminate the influence of air resistance, a vacuum system is adopted to provide the working vacuum environment for the core measurement components. In the working vacuum environment, the releasing device of the micro-nano ball, the optical path system of the first optical chamber and the main components of the second optical probe chamber are, as shown in the box in FIG. 2, placed in the vacuum chamber. There are light-transmitting glass holes on the wall of the vacuum chamber, so as to allow the input of the light beam placed outside the chamber and the output of the probe light inside the chamber to the probe optical path outside the chamber.

The vacuum chamber provides a vacuum working environment, and the degree of vacuum is controlled within $10^{-6}$ Pa, and serves as the movement space for the release, cooling, free fall and position measurement of the micro-nano ball. The movement interference of air molecules on the micro-nano ball is eliminated through the vacuum working environment provided by the vacuum chamber, thereby measuring the precision results.

An optical window is set on the vacuum chamber, and the optical window is a constant between the laser beams of the capturing light, the probe light and the cooling light between the inside and outside of the chamber, and the window is reserved when the vacuum chamber is fabricated.

Figure 5:
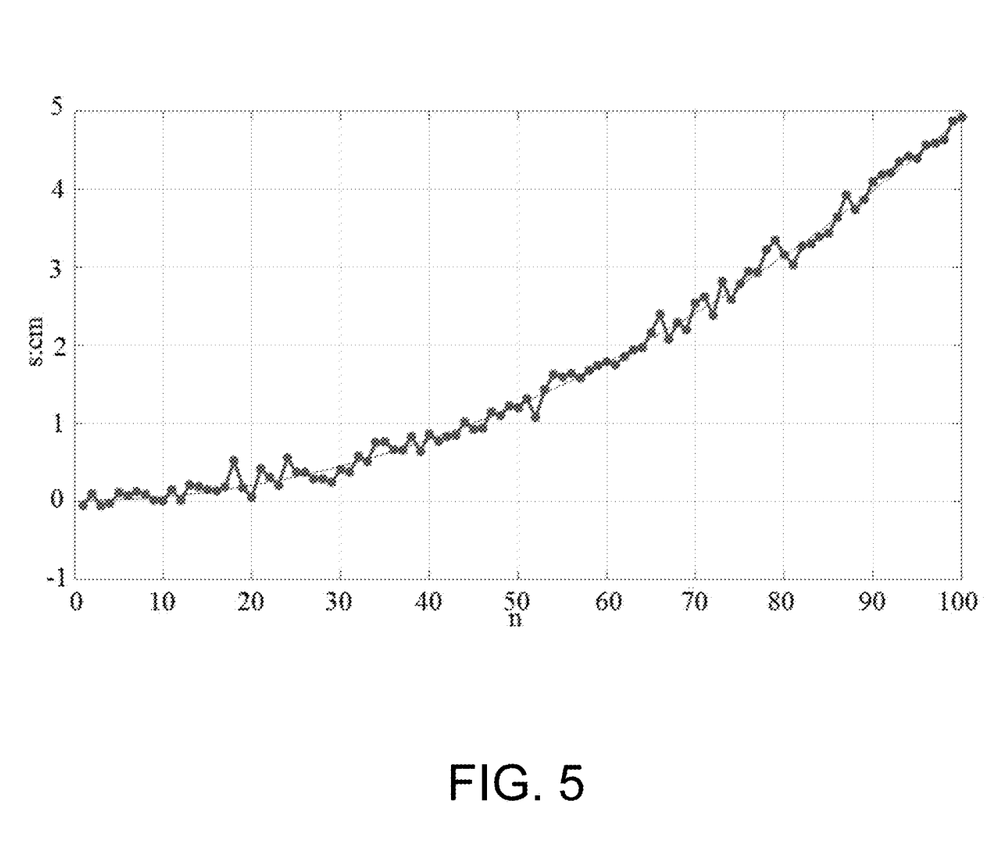
FIG. 5 is an example diagram of simulation data according to an embodiment of the present disclosure.

The simulation data of the embodiment of the present disclosure is shown in FIG. 5. According to the workflow, through software simulation, the test data output situation in the presence of noise is taken into consideration. The abscissa in the figure represents the serial number of the tests, and the ordinate is the falling displacement of the free-fall micro-nano ball; the unit of measurement is centimeters (cm).

In the data shown in FIG. 5, the output sampling period of the optical phase measurement is 1 millisecond, and 100 points are obtained by testing 100 times, forming a dotted line in the figure; then the free fall equation is adopted for fitting through least squares to obtain the measured value of g at this time is 9.8 m/s².

This FIG. 5 is only used as a schematic function of the data fitting process. The actual noise of each test point is magnified in the FIG. 5 to represent the fitting method of obtaining the absolute gravitational acceleration g.

What is claimed is:

1. An absolute gravimeter based on vacuum optical tweezers, comprising a vacuum system, micro-nano particles, a micro-nano particle releasing device, laser optical tweezers, an optical interferometer, and a signal processing device; wherein the micro-nano particle releasing device and the laser optical tweezers are all placed in the vacuum system;

the optical interferometer and the signal processing device are all located outside the vacuum system; the micro-nano particle releasing device is equipped with the micro-nano particles, the micro-nano particle releasing device is located above the laser optical tweezers, and the laser optical tweezers comprising two capturing beams which are horizontally coaxial and two convergent lenses, the two capturing beams pass through the respective convergent lenses and then converge at an intersection, an area where the intersection is located serves as an optical trap capturing region, and the micro-nano particles are stably captured by the two capturing beams in the optical trap capturing region; the optical interferometer is electrically connected to the signal processing device, the optical interferometer measures a displacement of the micro-nano particles in real time at the beginning of a free fall process from the optical trap capturing region and sends a displacement signal to the signal processing device, the signal processing device obtains a measured value of an absolute gravitational acceleration through method processing according to a real-time displacement of the micro-nano particles, wherein the optical interferometer comprises a laser, an upper emitting mirror, a lower emitting mirror, an upper polarizing beam splitting prism, a lower polarizing beam splitting prism, a receiving polarizing beam splitting prism, an upper glass plate, a lower glass plate, and a polarizer, the upper polarizing beam splitting prism and the upper glass plate are provided right above gravity drop of the micro-nano particles, the upper emitting mirror is arranged on a lateral side of the upper polarizing beam splitting prism, and the lower polarizing beam splitting prism and the lower glass plate are arranged directly under gravity drop of the micro-nano particles, the lower emitting mirror is set directly under the lower polarizing beam splitter prism, and the receiving polarizing beam splitter prism and the polarizer are arranged on a lateral side of the lower emitting mirror; the laser emits first and second linearly polarized beams with different frequencies, the first linearly polarized beam is transmitted through the upper polarizing beam splitter prism and the upper glass plate in turn from right above the micro-nano particles along a positive direction of a gravity direction, and then irradiated on the micro-nano particles, after being scattered by a surface of the micro-nano particles, an upper scattered light is generated, and the upper scattered light returns upward along an optical path, is transmitted by the upper glass plate, reflected by the upper polarizing beam splitter prism, and then incident on the upper emitting mirror, and incident on the receiving polarizing beam splitter prism after being reflected by the upper emitting mirror, and is reflected again, thus forming a first probe optical path, the second linearly polarized beam is reflected by the lower polarizing beam splitter prism in turn from a bottom of the micro-nano particles in an opposite direction of the gravity direction, and transmitted through the lower glass plate, and then irradiated to the micro-nano particles, after being scattered by the surface of the micro-nano particles, a lower scattered light is generated, and the lower scattered light is returned downward along the optical path, transmitted by the lower glass plate, reflected by the lower polarizing beam splitter prism, and then incident on the lower emitting mirror, and then incident on a receiving polarizing beam splitter prism after being reflected by the lower emitting mirror, and is transmitted again, thus forming a second probe optical path; the upper scattered light reflected by the receiving polarizing beam splitter and the lower scattered light reflected by the receiving polarizing beam splitter are converged and interfered, and then incident on a photoelectric conversion circuit through the polarizer to be collected and probed to obtain an interference signal.

2. The absolute gravimeter based on the vacuum optical tweezers according to claim 1, wherein a material of the micro-nano particles is silicon dioxide, of which a diameter is 1 micron to 30 microns in diameter.

3. An absolute gravity measuring method that is applied to the absolute gravimeter according to claim 1, wherein the method comprising the following steps:
   a) a laser of the vacuum optical tweezers is turned on to output the two horizontally capturing beams, and the optical trap capturing region is formed in a vacuum chamber through the respective converging lenses;
   b) the micro-nano particles are released through a micro-nano ball releasing device, and then the micro-nano particles move downward under the action of gravity to free fall to the optical trap capturing region, and are stably captured in the center of the optical trap capturing region;
   c) the optical interferometer is turned on, and an interferometric measurement of a displacement of the micro-nano particles begins;
   the capturing beams of the laser of the vacuum optical tweezers are turned off, and the micro-nano particles are released from the center of the optical trap capturing region under the action of gravity and free fall downward along the direction of gravity;
   when the capturing beams are turned off, a real-time change process of the displacement of the micro-nano particles is measured by the optical interferometer, and a measurement time series s of the displacement over time is obtained;
   d) fitting is performed according to the measurement time series s to obtain a measurement value of the absolute gravity;
   e) the optical interferometer is turned off and the measurement is ended;
   f) the above a)~e) steps are repeated to achieve continuous measurement of the absolute gravity.

4. The absolute gravity measuring method according to claim 3, wherein the method for measuring a displacement signal s(n) of the micro-nano particles during free fall is specifically as follows: an interference signal is collected and detected by the optical interferometer, according to an analysis of the interference signal, a current phase dφ is measured in real time and output at regular intervals, a measurement value of an optical phase change is obtained for each acquisition, and a sampling interval is T, sampling is performed continuously to obtain n real-time measurement value series dφ(n) of the optical phase change, according to the following equation, the displacement signal s(n) of the n-th measurement of the micro-nano particles is obtained, and then the measurement time series s of the displacement over time is obtained:

$$s(n)=d\varphi(n)\times\lambda/8\pi$$

wherein $\lambda$ is a light wavelength adopted by the optical interferometer, n is a serial number of the measurement sampling, which is taken as a natural number, and an atomic clock provides a unified timing signal and a time reference.

5. The absolute gravity measuring method according to claim 3, wherein the fitting according to the measurement time series s is performed by adopting a least squares method, and a measurement value g of the absolute gravity is obtained by fitting the input measurement time series s according to the following equation:

$$s(n)=s(0)+g\times(nT)^2/2$$

wherein s(n) represents the displacement signal of the n-th measurement of micro-nano particles, s(0) is a constant coefficient, n represents a total number of the measurement value in the measurement time series, T is a sampling time, and an atomic clock provides a unified timing signal and a time reference.

6. An absolute gravity measuring method that is applied to the absolute gravimeter according to claim 2, wherein the method comprising the following steps:
   a) a laser of the vacuum optical tweezers is turned on to output the two horizontally capturing beams, and the optical trap capturing region is formed in a vacuum chamber through the respective converging lenses;
   b) the micro-nano particles are released through a micro-nano ball releasing device, and then the micro-nano particles move downward under the action of gravity to free fall to the optical trap capturing region, and are stably captured in the center of the optical trap capturing region;
   c) the optical interferometer is turned on, and an interferometric measurement of a displacement of the micro-nano particles begins;
   the capturing beams of the laser of the vacuum optical tweezers are turned off, and the micro-nano particles are released from the center of the optical trap capturing region under the action of gravity and free fall downward along the direction of gravity;
   when the capturing beams are turned off, a real-time change process of the displacement of the micro-nano particles is measured by the optical interferometer, and a measurement time series s of the displacement over time is obtained;
   d) fitting is performed according to the measurement time series s to obtain a measurement value of the absolute gravity;
   e) the optical interferometer is turned off and the measurement is ended;
   f) the above a)~e) steps are repeated to achieve continuous measurement of the absolute gravity.

7. The absolute gravity measuring method according to claim 6, wherein the method for measuring a displacement signal s(n) of the micro-nano particles during free fall is specifically as follows: an interference signal is collected and detected by the optical interferometer, according to an analysis of the interference signal, a current phase dφ is measured in real time and output at regular intervals, a measurement value of an optical phase change is obtained for each acquisition, and a sampling interval is T, sampling is performed continuously to obtain n real-time measurement value series dφ(n) of the optical phase change, according to the following equation, the displacement signal s(n) of the n-th measurement of the micro-nano particles is obtained, and then the measurement time series s of the displacement over time is obtained:

$$s(n)=d\varphi(n)\times\lambda/8\pi$$

wherein λ is a light wavelength adopted by the optical interferometer, n is a serial number of the measurement sampling, which is taken as a natural number, and an atomic clock provides a unified timing signal and a time reference.

8. The absolute gravity measuring method according to claim 6, wherein the fitting according to the measurement time series s is performed by adopting a least squares method, and a measurement value g of the absolute gravity is obtained by fitting the input measurement time series s according to the following equation:

$$s(n)=s(0)+g\times(nT)^2/2$$

wherein s(n) represents the displacement signal of the n-th measurement of micro-nano particles, s(0) is a constant coefficient, n represents a total number of the measurement value in the measurement time series, T is a sampling time, and an atomic clock provides a unified timing signal and a time reference.

* * * * *